United States Patent Office 2,766,315
Patented Oct. 9, 1956

2,766,315

ELECTROLYTE AND SEPARATOR FOR LOW TEMPERATURE PRIMARY GALVANIC CELLS

George T. Jobe, Cleveland, and Albert F. Vinal, Shaker Heights, Ohio, assignors to Union Carbide and Carbon Corporation, a corporation of New York No Drawing. Application June 12, 1953,
Serial No. 361,426

3 Claims. (Cl. 136—103)

This invention relates to primary galvanic cells for use at low temperatures and refers more particularly to separator and electrolyte combinations therefor.

In primary galvanic cells of the "dry" type having a consumable metal anode, usually zinc, a depolarizer mix, usually manganese dioxide and a nonconsumable cathode, usually carbon, it is necessary to provide a separator between the anode and the depolarizer mix. This separator, in addition to preventing actual physical contact between anode and depolarizer mix and consequent short-circuiting of the cell, must absorb electrolyte and be in intimate contact with the anode. The conventional separator utilized in dry cell construction for many years is a starch gel.

In the conventional general purpose dry cell of commerce the electrolyte is an aqueous solution consisting essentially of ammonium chloride. Cells containing such electrolyte and a starch separator are perfectly satisfactory for general use but are not capable of rendering good service at low temperatures. Much of the blame for poor service of dry cells at low temperatures has been attributed to the electrolyte, and several modified electrolytes have been proposed for use in cells to be operated at low temperatures. Among such modified electrolytes are those containing in aqueous solution lithium chloride or calcium chloride with or without zinc chloride and ammonium chloride.

While the introduction of such electrolytes made possible the attainment of substantial improvement in service life of dry cells operating at low temperatures, there is still need for improvement, and it is the principal object of this invention to provide such improvement.

This object is achieved by the invention which comprises, in combination in a primary galvanic cell for low temperature use, a separator of methyl cellulose and an electrolyte, especially suited for low temperature cells, containing calcium chloride, lithium chloride, or both, in restricted proportions and having a limited, critical proportion of zinc chloride. The invention is based on the discovery that a film of methyl cellulose has the property of absorbing, without being itself dissolved, increasingly large amounts of electrolytes containing calcium chloride or lithium chloride or both as the temperature of operation is lowered, provided the electrolyte also contains zinc chloride in the concentration range of 1% to 10%.

In accordance with the invention a primary galvanic cell for use at temperatures as low as $-54°$ C. is provided with a separator consisting of a film of methyl cellulose of the water-soluble type and an electrolyte composed of an aqueous solution containing by weight 5% to 30% in the aggregate of at least one of the salts lithium chloride and calcium chloride, 1% to 10% zinc chloride, up to 5% ammonium chloride, the remainder water. Zinc chloride is of benefit in improving absorption by the film of electrolyte at room temperature as well as being beneficial in other respects, but the zinc chloride content should not exceed 10%.

The separator used in the invention may be prepared conveniently by casting an aqueous solution of methyl cellulose onto a smooth surface, and evaporating the water. Water-soluble methyl cellulose is available commercially in several viscosity grades. A preferred grade has a viscosity of 4000 centipoises in a 2% solution.

As has been indicated above, one of the principal functions of a separator in a dry cell is to provide at the anode an adequate supply of electrolyte for cell operation. This is especially important in cells to be used at low temperatures. Therefore, the suitability of a separator material may be determined in part by its ability to absorb electrolyte. Tests of several separator materials in contact with several electrolytes have indicated methyl cellulose to be the best material of those tested. In such tests a weighed sample of separator film material was wet with electrolyte to determine the volume (in milliliters) of electrolyte absorbed per unit weight (in grams) of separator film. The tests were conducted at different temperatures. Typical results are reported in Table I.

*Table I*

| Film Type | Electrolyte Absorption in Ml./Gm. | | | | | |
|---|---|---|---|---|---|---|
| | $LiCl-ZnCl_2-NH_4Cl$ | | $CaCl_2$ | | $CaCl_2-ZnCl_2-NH_4Cl$ | |
| | 25° C. | −40° C. | 25° C. | −40° C. | 25° C. | −40° C. |
| Methyl cellulose | 12.8 | dissolved | 1.5 | 32.9 | 8.3 | 18.8 |
| Polyvinyl alcohol | dissolved | 1.0 | dissolved | 1.2 | dissolved | 1.5 |
| Cellophane | 3.7 | 2.4 | 3.4 | 3.1 | 3.9 | 4.2 |

As will be seen from the data in Table I, polyvinyl alcohol film separators dissolved in the electrolytes at 25° C. but absorbed only a small amount of electrolyte at −40° C.; cellophane separators absorbed only limited quantities of electrolyte at either temperature, but the methyl cellulose film separators absorbed much more electrolyte at −40° C. than they did at 25° C.

Of course the separator must not absorb so much electrolyte that it dissolves therein, and this requirement establishes another criterion for suitability of a material for separator use. Absorption tests similar to those above reported in which a weighed sample of methyl cellulose film was wet with electrolyte were conducted at different temperatures with different electrolytes to determine the volume (in milliliters) of electrolyte absorbed per unit weight (in grams) of films. Typical test results are reported in Table II below.

*Table II*

| Electrolyte Composition (Remainder $H_2O$) | | | | Absorption in Ml./Gm. (Remainder $H_2O$) | | |
|---|---|---|---|---|---|---|
| Percent LiCl | Percent $CaCl_2$ | Percent $ZnCl_2$ | Percent $NH_4Cl$ | 25° C. | −40° C. | −54° C. |
| Nil | 23.8 | 9.5 | 4.8 | 8.3 | 18.8 | |
| 25 | Nil | 5 | Nil | 5.9 | 20.7 | 12.3 |
| 25 | Nil | Nil | Nil | 2.1 | Dissolved | |
| 5 | 23.7 | Nil | Nil | 2.3 | 28.4 | |
| Nil | 21.5 | 14.3 | 4.8 | Dissolved | 34.5 | |

It will be noted from the data in Table II that the amount of electrolyte absorbed by the film was larger in every case at the lower temperature and that in the case of the third electrolyte the film actually dissolved at −40° C. In the case of the fourth electrolyte, which contained no zinc chloride, absorption at 25° C. was unsatisfactory, and in the case of the last electrolyte in the table, containing 14.3% zinc chloride, the film was dissolved at 25° C. Accordingly the combination of methyl cellulose separator and these electrolytes would be unsuitable. On the other hand absorption of the first two electrolytes listed in the table was entirely satisfactory at 25° C. and at −40° C.

A preferred electrolyte for use in the invention contains by weight about 25% lithium chloride and 5% zinc chloride, remainder water. Batteries of cells made with an electrolyte of this composition and a methyl cellulose separator had substantially superior service capacity at low temperatures than similar batteries made with different separators.

What is claimed is:

1. In combination in a dry primary galvanic cell for use at low temperatures an aqueous electrolyte containing by weight 5% to 30% of at least one salt selected from the group consisting of lithium chloride and calcium chloride, 1% to 10% zinc chloride, up to 5% ammonium chloride, the remainder water, and a separator composed of a film of methyl cellulose, said separator being wet with said electrolyte.

2. In combination in a dry primary galvanic cell for use at low temperatures an aqueous electrolyte containing by weight about 25% lithium chloride, 5% zinc chloride, remainder substantially water and a separator composed of a film of methyl cellulose, said separator being wet with said electrolyte.

3. A dry primary galvanic cell for use at low temperatures comprising a consumable metal anode, a nonconsumable cathode, a depolarizer mix, a separator composed of methyl cellulose film and spaced between said anode and depolarizer mix and in intimate contact therewith and an electrolyte composed of an aqueous solution containing by weight 5% to 30% of at least one salt selected from the group consisting of lithium chloride and calcium chloride, 1% to 10% zinc chloride and up to 5% ammonium chloride, said separator being wet with said electrolyte.

References Cited in the file of this patent

UNITED STATES PATENTS

| | | |
|---|---|---|
| 2,403,571 | Wilke | July 9, 1946 |
| 2,445,306 | Lawson | July 13, 1948 |

OTHER REFERENCES

Trans. Electrochemical Society, vol. 90, 1946, "Low Temperature Dry Cells," by Otto et al., pages 419–432.

Trans. Electrochemical Society, vol. 90, 1946, "Dry Cells . . . Containing Lithium Chloride . . ." by Wilke, pages 433–440.